(12) United States Patent
Bhandaru et al.

(10) Patent No.: US 10,182,014 B2
(45) Date of Patent: Jan. 15, 2019

(54) DATA COMMUNICATION IN A PEER-TO-PEER NETWORK

(71) Applicant: Broadcom Corporation, Irvine, CA (US)

(72) Inventors: Nehru Bhandaru, San Jose, CA (US); Qi Wang, San Francisco, CA (US)

(73) Assignee: Avago Technologies International Sales Pte. Limited, Singapore (SG)

( * ) Notice: Subject to any disclaimer, the term of this patent is extended or adjusted under 35 U.S.C. 154(b) by 179 days.

(21) Appl. No.: 15/162,534

(22) Filed: May 23, 2016

(65) Prior Publication Data

US 2016/0345318 A1    Nov. 24, 2016

Related U.S. Application Data

(60) Provisional application No. 62/165,832, filed on May 22, 2015.

(51) Int. Cl.
| | | |
|---|---|---|
| H04L 12/807 | (2013.01) | |
| H04L 29/08 | (2006.01) | |
| H04W 8/00 | (2009.01) | |
| H04W 76/14 | (2018.01) | |
| H04L 12/841 | (2013.01) | |
| H04W 84/18 | (2009.01) | |

(52) U.S. Cl.
CPC .............. *H04L 47/27* (2013.01); *H04L 47/28* (2013.01); *H04L 67/1061* (2013.01); *H04L 67/141* (2013.01); *H04W 8/005* (2013.01); *H04W 76/14* (2018.02); *H04W 84/18* (2013.01)

(58) Field of Classification Search
None
See application file for complete search history.

(56) References Cited

U.S. PATENT DOCUMENTS

| | | | | |
|---|---|---|---|---|
| 2016/0014669 A1* | 1/2016 | Patil | ..................... | H04W 40/246 370/329 |
| 2016/0014715 A1* | 1/2016 | Patil | .................. | H04W 52/0216 370/329 |
| 2016/0073288 A1* | 3/2016 | Patil | ...................... | H04W 74/08 370/230 |
| 2016/0157089 A1* | 6/2016 | Qi | ....................... | H04W 76/046 370/254 |

(Continued)

*Primary Examiner* — Otis L Thompson, Jr.
(74) *Attorney, Agent, or Firm* — Morgan Lewis & Bockius LLP

(57) ABSTRACT

A device for facilitating data communication in a peer-to-peer network may include at least one processor circuit. The processor circuit may be configured to initiate, in or outside a discovery time window, a data connection setup with a second device. The processor circuit may be configured to, when the data connection setup is not completed within the discovery time window, select a negotiation time window based on at least one of an advertised availability of the device or an advertised availability of the second device and resume, in the negotiation time window, the data connection setup. The processor circuit may be configured to receive information associated with one or more data transfer time windows from the second device upon completion of the data connection setup, where the one or more data transfer time windows are selected based at least on the data connection setup.

35 Claims, 7 Drawing Sheets

(56) References Cited

U.S. PATENT DOCUMENTS

| | | | |
|---|---|---|---|
| 2016/0165653 A1* | 6/2016 | Liu | H04W 76/023 |
| | | | 370/329 |
| 2016/0262100 A1* | 9/2016 | Larsson | H04W 48/16 |
| 2016/0286574 A1* | 9/2016 | Abraham | H04L 63/065 |
| 2017/0127447 A1* | 5/2017 | Huang | H04W 74/0816 |
| 2017/0201866 A1* | 7/2017 | Liu | H04W 4/06 |
| 2017/0317938 A1* | 11/2017 | Abraham | H04L 9/34 |

\* cited by examiner

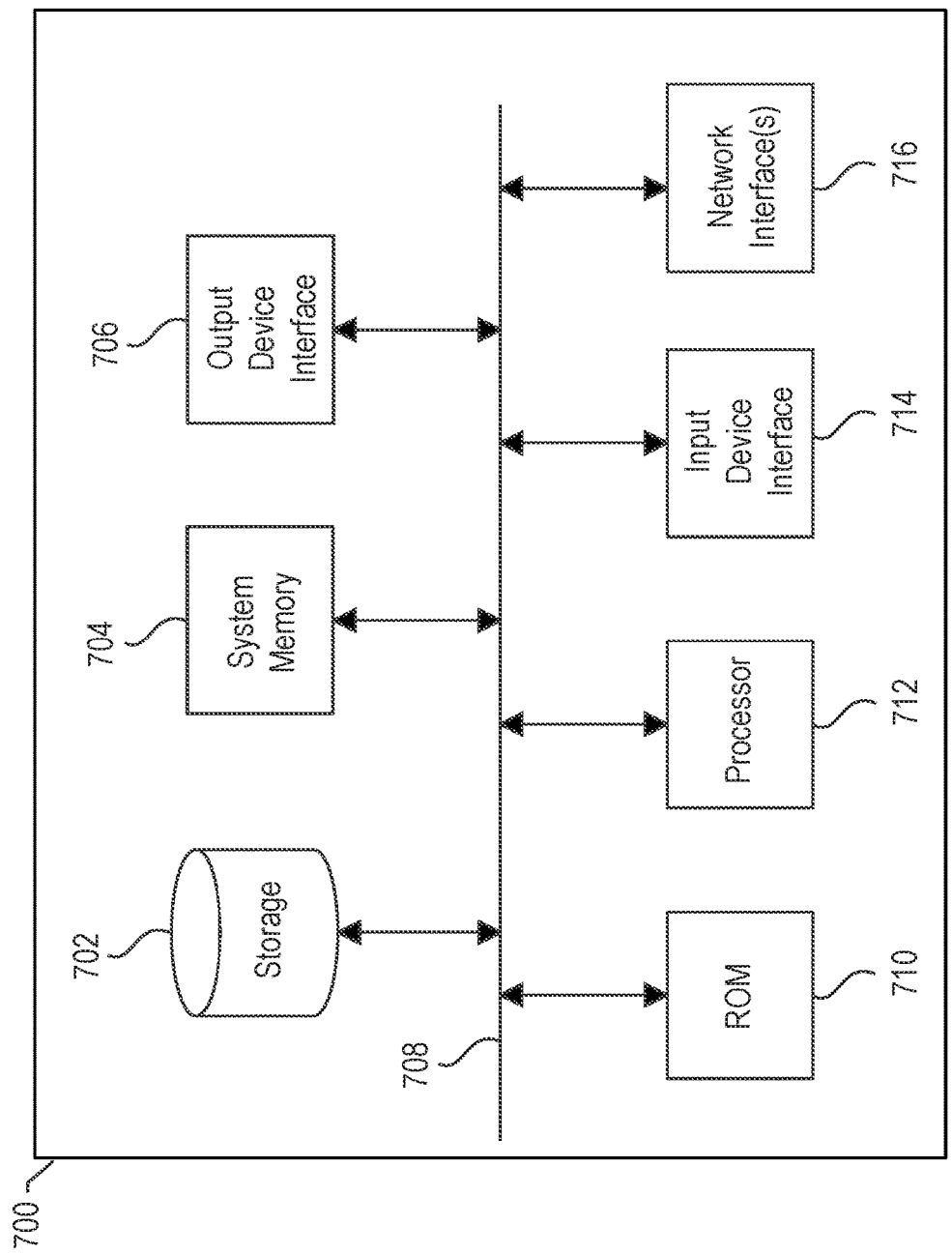

DATA COMMUNICATION IN A PEER-TO-PEER NETWORK

CROSS-REFERENCE TO RELATED APPLICATIONS

The present application claims the benefit of U.S. Provisional Patent Application Ser. No. 62/165,832, entitled "Data Communication in a Peer-to-Peer Network," filed on May 22, 2015, which is hereby incorporated by reference in its entirety for all purposes.

TECHNICAL FIELD

The present description relates generally to data communication, including data communication in a peer-to-peer network.

BACKGROUND

Peer-to-peer networking technologies enable wireless devices to communicate directly with one another without requiring a wireless access point. The wide adoption of Wi-Fi across multiple different types of user devices, e.g. computers, mobile phones, tablets, etc., makes Wi-Fi well-suited for peer-to-peer communications.

BRIEF DESCRIPTION OF THE DRAWINGS

Certain features of the subject technology are set forth in the appended claims. However, for purpose of explanation, several embodiments of the subject technology are set forth in the following figures.

FIG. 7 conceptually illustrates an electronic system with which one or more implementations of the subject technology may be implemented.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, the subject technology is not limited to the specific details set forth herein and may be practiced using one or more implementations. In one or more instances, structures and components are shown in block diagram form in order to avoid obscuring the concepts of the subject technology.

Figure 1:
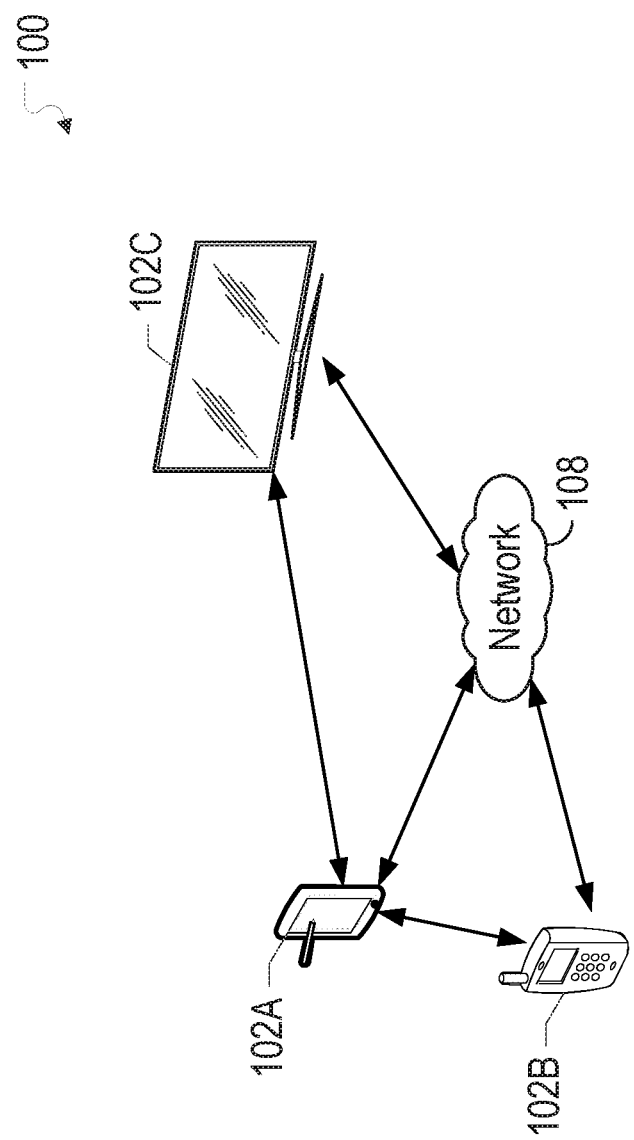
FIG. 1 illustrates an example network environment in which a system for data communication in a peer-to-peer network may be implemented in accordance with one or more implementations.

FIG. 1 illustrates an example network environment 100 in which a system for data communication in a peer-to-peer network can be implemented in accordance with one or more implementations. Not all of the depicted components may be used, however, and one or more implementations may include additional components not shown in the figure. Variations in the arrangement and type of the components may be made without departing from the spirit or scope of the claims as set forth herein. Additional components, different components, or fewer components may be provided.

The network environment 100 includes one or more electronic devices 102A-C that are communicably coupled via one or more peer-to-peer connections. The electronic devices 102A-C can be computing devices such as laptop or desktop computers, smartphones, set-top boxes, peripheral devices, user input devices, tablets, televisions or other displays with one or more processors coupled thereto and/or embedded therein, or other appropriate devices that include wireless network interfaces, such as wireless local area network (WLAN) radios. In the example network environment 100 of FIG. 1, the electronic device 102A is depicted as a tablet device, the electronic device 102B is depicted as a smartphone, and the electronic device 102C is depicted as a television. By way of non-limiting example, the data communication in the peer-to-peer network may include communication (e.g., transmission, reception) between the electronic devices 102A-C of advertisement information, data connection setup information, traffic indication information, data frames, ranging measurements, and so forth. One or more of the electronic devices 102A-C may be and/or may include all or part of the electronic system discussed below with respect to FIG. 7.

The electronic devices 102A-C may include appropriate wireless network interfaces for establishing direct, e.g. peer-to-peer, network connections, such as Wi-Fi Direct connections, Bluetooth connections, or generally any direct wireless network connections. In FIG. 1, the electronic device 102A is illustrated as capable of forming peer-to-peer connections with each of the electronic devices 102B-C. However, the electronic devices 102B-C may also be capable of forming peer-to-peer connections with one another, e.g. independent of the electronic device 102A. Although the example network environment 100 includes the electronic devices 102A-C, fewer, more, and/or different electronic devices may be utilized in a peer-to-peer network.

In one or more implementations, alternative and/or in addition to a direct wireless network connection between the electronic devices 102A-C, the electronic devices 102A-C are communicably coupled to a network 108. The network 108 may include one or more wired and/or wireless network devices, such as wireless access devices, routers, switches, etc. that may facilitate communication between the electronic devices 102A-C. For instance, the network 108 may include wired Ethernet devices, Multimedia over Coax Alliance (MoCA) devices, HomePlug devices, and the like.

The peer-to-peer connections may be utilized by the electronic device 102A to access services/content provided by and/or provide services/content to the electronic devices 102B-C. For example, the electronic device 102A may deliver audio and/or video streams to the electronic device 102C, and/or to a device coupled to the electronic device 102C, such as an adapter, a dongle, etc. The electronic device 102A may transcode the audio and/or video streams prior to delivering the audio and/or video streams to the electronic device 102C. The electronic device 102C may output and/or present the audio and/or video streams, e.g. to a user.

The electronic devices 102A-C may utilize and/or rely on a discovery protocol, such as a pre-association discovery protocol, to discover, pair, and form the peer-to-peer network connections. In some cases, as part of the discovery protocol, the electronic devices 102A-C may utilize a time synchronization protocol to select/converge (e.g., agree) on a time reference. The electronic devices 102A-C may utilize an agreed upon time reference to define time windows.

To enable WLAN data communication in a peer-to-peer network, the electronic devices 102A-C may perform a device and service discovery procedure. Subsequently, the electronic devices 102A-C may choose to exchange service data, if desired. The device and service discovery may occur within specific common time windows agreed upon by all the electronic devices in the peer-to-peer network during the time synchronization. These common time windows may be referred to as discovery time windows (DTWs) or discovery windows (DWs). The DTWs can be periodically or non-periodically recurring. In some cases, during the DTWs, all the electronic devices in the peer-to-peer network, including the electronic devices 102A-C, may be turned on (e.g., awake) to facilitate exchanges that may occur during the device and service discovery.

Figure 2:
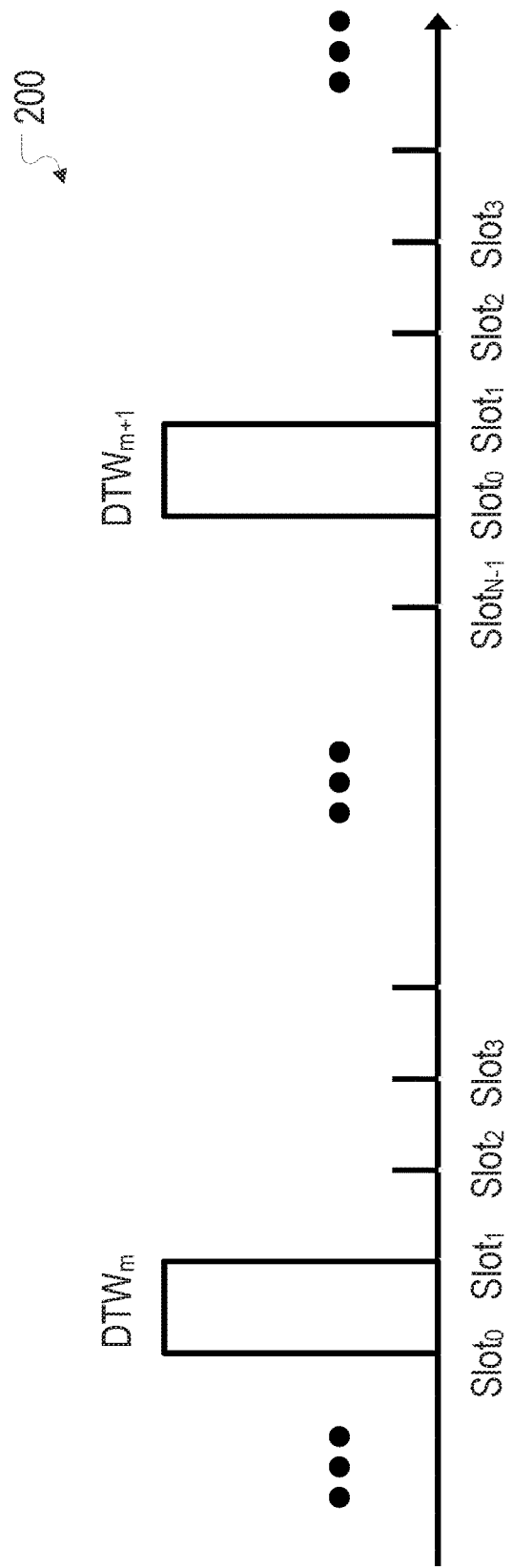
FIG. 2 illustrates an example common time reference for a peer-to-peer network.

FIG. 2 illustrates an example common time reference 200 for a peer-to-peer network. The example common time reference 200 may be utilized by the electronic devices 102A-C. In this regard, one or more and/or all electronic devices in the peer-to-peer network, including the electronic devices 102A-C, may agree upon time windows for DTWs. In the example common time reference 200, a time duration between adjacent DTWs (e.g., $DTW_m$ and $DTW_{m+1}$) is divided into N time slots. The number of time slots and/or time duration between any two adjacent DTWs may remain the same (e.g., DTWs recur periodically) or may be different (e.g., DTWs recur non-periodically). As an example, the number of time slots N may be 32 time slots, and/or the time duration of each time slot may be 16 milliseconds. Other values for N and/or other time durations for each time slot may be utilized. In some cases, availability of the electronic devices for transmitting/receiving data outside of the DTWs may be advertised during the DTWs.

The subject technology may facilitate data transfers between peer-to-peer devices in a peer-to-peer network. The data transfers may involve communication (e.g., transmission, reception) of data frames, ranging measurements, among others. The data transfers may be applied to various WLAN operation frequency bands including, by way of non-limiting example, 2.4 GHz, 5 GHz, 60 GHz, 900 MHz, TV white spaces, and/or any other frequency bands.

One or more implementations of the subject technology provide systems and methods for establishing timing for data transfers outside of DTWs between peer-to-peer devices (e.g., the electronic devices 102A-C). The timing may be established in a scalable and power efficient manner and facilitate reduction of medium congestion. For instance, the electronic devices 102A-C may be in a higher power state (e.g., awake state) at agreed upon times for scheduled data transfers, and may be in a lower power state (e.g., asleep state, reduced power state) at times with no scheduled data transfers. The subject technology includes enabling a pair of devices (e.g., the electronic devices 102A and 102B) to establish a first common time slot in which the devices can negotiate a subsequent time slot (e.g., outside of DTW) for data transfer. The negotiation may be based on an availability associated with the pair of devices. For instance, a device in the peer-to-peer network may provide its availability (e.g., in an advertisement frame) as a set of time slot and channel combinations during which a device is or is potentially (e.g., can be) available. To reduce medium congestion, randomization of time slot assignment may be utilized in selecting the subsequent time slot.

Figure 3:
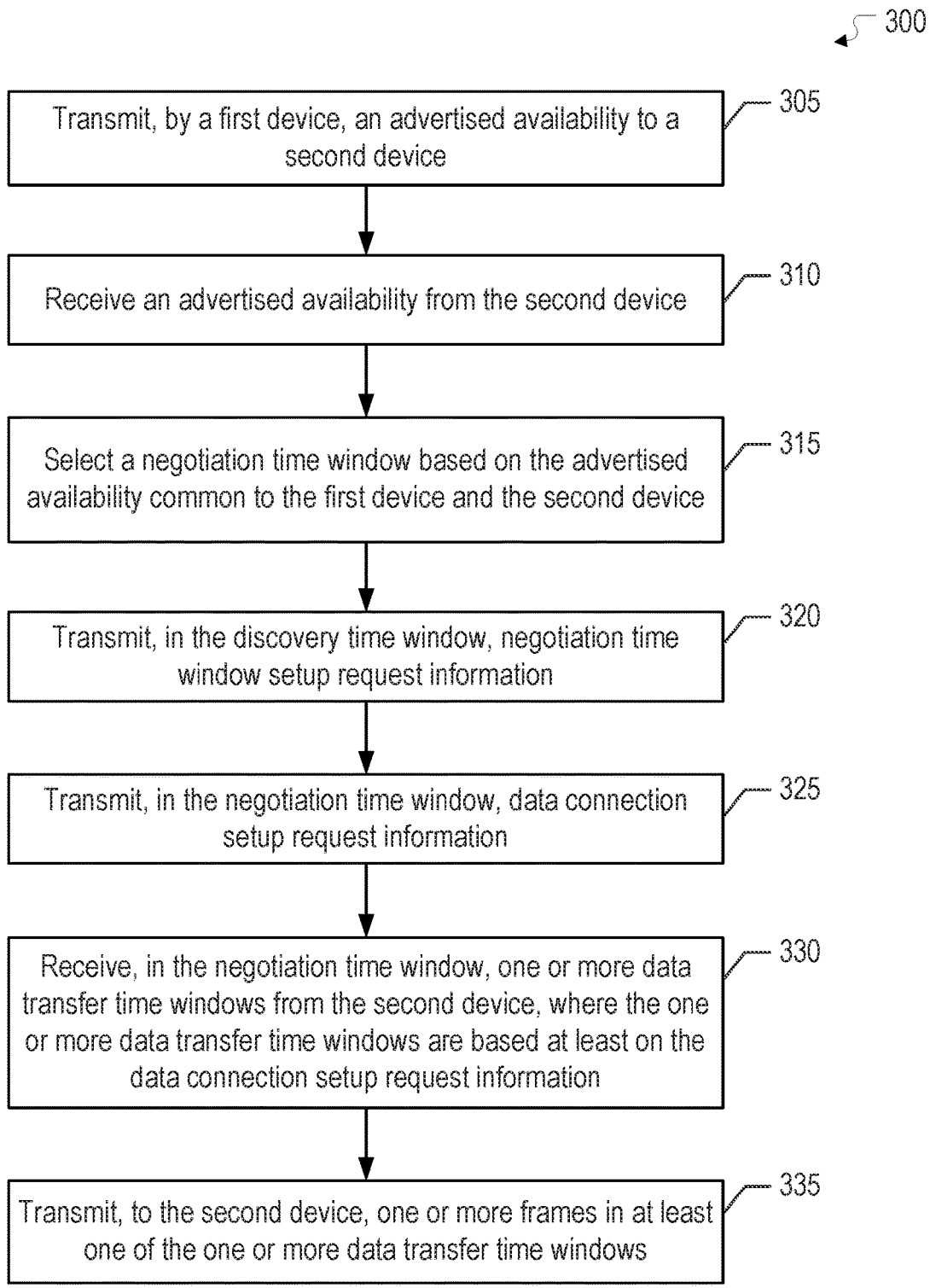
FIG. 3 illustrates a flow diagram of an example process for data communication in a peer-to-peer network in accordance with one or more implementations.

FIG. 3 illustrates a flow diagram of an example process 300 for data communication in a peer-to-peer network in accordance with one or more implementations. For explanatory purposes, the example process 300 is described herein with reference to the electronic devices 102A-B of the example network environment 100 of FIG. 1; however, the example process 300 is not limited to the electronic devices 102A-B of the example network environment 100 of FIG. 1. The blocks of example process 300 are described herein as occurring in serial, or linearly. However, multiple blocks of example process 300 may occur in parallel. In addition, the blocks of example process 300 need not be performed in the order shown and/or one or more of the blocks of example process 300 need not be performed.

The electronic device 102B transmits an advertised availability to the electronic device 102A (305). The electronic device 102B may transmit the advertised availability to the electronic device 102A as part of an advertisement frame. The advertised availability may include a potential availability (PAV) of the electronic device 102B, a committed availability (CAV) of the electronic device 102B, or both, represented as $PAV_B$ and $CAV_B$, respectively. The $CAV_B$ may include a time duration(s) (e.g., time slot(s)) during which and/or a channel(s) at which the electronic device 102B is available (e.g., is scheduled to be awake). In general, the electronic device 102B may advertise its CAV by providing the time slots during which the electronic device 102B is available, along with the channel at which the electronic device 102B is available for each time slot. The $PAV_B$ may include the time duration(s) during which and/or the channel(s) at which the electronic device 102B can be available (e.g., may be awake or can be scheduled to be awake and available). The electronic device 102B may advertise its PAV by providing the time slots during which the electronic device 102B is potentially available (e.g., may potentially be awake), along with the potential channel(s) at which the electronic device 102B may be available for each potential time slot.

The electronic device 102B receives an advertised availability from the electronic device 102A (310). The electronic device 102A may transmit the advertised availability to the electronic device 102B as part of an advertisement frame. The advertised availability may include a PAV, a CAV of the electronic device 102A, or both, represented as $PAV_A$ and $CAV_A$, respectively. In order to conserve power, the electronic devices 102A and 102B may be in a reduced power state (e.g., asleep) during their respective PAV slots, unless a peer device requests a data exchange during a PAV slot (e.g., time slot and channel), in which case the PAV slot may then be converted to a CAV slot.

One or more of the electronic devices 102A-C may maintain and update its CAV and PAV. The CAV may be associated with a currently confirmed availability of the device whereas the PAV may be associated with a potential availability of the device that may be confirmed in the future, e.g. by converting the PAV to CAV. The PAV of the device may be based on an operational status of the device. The operational status may indicate other operations that the device may be performing, such as multi-mode concurrent operation. For instance, the device may be performing other operations outside of operations associated with the peer-to-peer communication between the electronic devices 102A-C. The CAV of a device is generally a subset of the PAV of the device. However, in some cases, the CAV is not a subset of the PAV. In some cases, the CAV may be an empty set whereas the PAV is a non-empty. The CAV and/or PAV may provide availability of the device within two adjacent DTWs as well as outside of the two adjacent DTWs. For instance, the CAV and/or PAV may provide availability over a number of DTWs, which could be indefinite.

The electronic device 102B selects a negotiation time window (NTW) based on the advertised availability common to both the electronic device 102A and the electronic device 102B (315). The NTW is the period of time when, and the channel at which, the electronic device 102A and 102B perform data communication setup (i.e., negotiation and agreement on the time slot(s) and channel(s) for data communication). The electronic device 102B may select the NTW based on at least one of the intersections of the $PAV_A$ advertised by the electronic device 102A and the $PAV_B$ advertised by the electronic device 102B. In some cases, the electronic device 102B may select the NTW based on an overlap in the advertised availability (e.g., overlap in time duration and/or overlap in channel), denoted as $PAV_{AB}$, of the electronic device 102A and 102B.

The electronic device 102B transmits, in the discovery time window, NTW setup request information (320). The electronic device 102B may transmit an NTW Setup Request frame (also referred to as an NTW setup request frame) within the DTW to the electronic device 102A to indicate its ability and/or interest to set up a data connection (e.g., data frame communication, ranging measurements, and/or other services) with the electronic device 102A. The NTW Setup Request frame may be utilized to notify the electronic device 102A of the NTW and request that the electronic device 102A conduct/resume the data connection setup in the NTW. In some other cases, the electronic device 102B may transmit an NTW Setup Request frame, within a time slot which is outside of an DTW and is part of the advertised CAV by the electronic device 102A, to the electronic device 102A to indicate its ability and/or interest to set up a data connection (e.g., data frame communication, ranging measurements, and/or other services) with the electronic device 102A. If the electronic device 102A accepts the negotiation request from the electronic device 102B, the electronic device 102A commits the NTW (e.g., channel and time slot) associated with the negotiation request to its CAV and remains awake during the NTW to allow data connection setup with the electronic device 102B during the NTW. The concept of NTW is logic. In some cases, an NTW is outside of a DTW. In some other cases, NTW is inside DTW when it is feasible to exchange the data connection setup frames between the electronic device 102B and 102A within a DTW.

The NTW setup request frame may include a set of tuples. Each tuple may include, by way of non-limiting example, a media access control (MAC) address, channel (including frequency band) to be used, time slot corresponding to the NTW to be used for setup, desired setup type(s), and/or additional setup information (e.g., for the indicated setup type(s)). The MAC address may be a unicast address of the electronic device 102A (e.g., the peer device) to indicate interest of the electronic device 102B for a one-to-one communication with the electronic device 102A. The MAC address may be a multicast address associated with multiple electronic devices to indicate interest for one-to-many or many-to-many communication. The setup types may indicate a setup for data communication, ranging measurement, among others. In some cases, different channel(s) and/or time slot(s) may be advertised to different peer devices.

The electronic device 102B transmits, in the negotiation time window, data connection setup request information (325). The electronic device 102B may transmit the data connection setup request information to the electronic device 102A as part of a data connection setup request frame. The data connection setup request information may include setup type(s), potential time and channel availability of the electronic device 102B, along with other operational parameters.

The electronic devices 102A and/or the electronic device 102B may modify/update their respective PAVs to determine a suitable common time slot between the electronic device 102A and the electronic device 102B. In some cases, if the CAV and PAV advertised by the electronic device 102A are not suitable for operation of the electronic device 102B, then the electronic device 102B does not attempt the setup with the electronic device 102A. In some cases, the potential availability advertised in the setup request information by the electronic device 102B may be represented as $PAV_B^*$, which may be different from $PAV_B$ advertised during the DTW. In some cases, $PAV_B^*$ may be a subset of $PAV_B$. In some cases, the $PAV_B^*$ may include preferred times and/or channels of the electronic device 102B for communicating with the electronic device 102A. For instance, the $PAV_B^*$ may be based on a priority assigned to the electronic device 102A (e.g., by the electronic device 102B), with higher priority devices receiving more advertised availability (e.g., provided a larger set for $PAV_B^*$) and/or earlier availability (e.g., provided earlier time slots for $PAV_B^*$).

The electronic device 102B receives, in the negotiation time window, one or more data transfer time windows (XTWs) from the electronic device 102A (330). The XTWs may collectively be included in a data transfer availability (DAV) (e.g., DAV={$XTW_1$, $XTW_2$, ... }). The electronic device 102A may provide the XTWs as part of a data connection setup response frame. The data connection setup response frame may include time and channel information the DAV selected by the electronic device 102A based at least on content of the data connection setup request information from the electronic device 102B. The DAV may also be based on internal information (e.g., internal status) of the electronic device 102A. For instance, the internal information may include resources utilized by other operations (e.g., operations outside of the peer-to-peer operations) performed by the electronic device 102A. The DAV may include time window and channels for allowing data transfer (e.g., data communication, ranging measurements, etc.) between the electronic device 102A and 102B.

In some cases, if the electronic device 102B does not receive a data connection setup response from the electronic device 102A in response to the setup request information from the electronic device 102B, the electronic device 102B may attempt to reschedule a data connection setup by transmitting an NTW setup request frame in a subsequent DTW and/or opportunistically based on the CAV advertised by the electronic device 102A. In some aspects, there may be multiple DTWs between the NTW and the DTW in which the NTW setup request appears.

The electronic devices 102B and 102A exchange frames with each other in at least one of the XTWs from the electronic device 102A (335). The frame may be for data communication (e.g., audio, video, file), ranging (e.g., distance) measurements, or other data types (e.g., previously indicated to the electronic device 102A in the data connection setup request information).

In some cases, blocks 325 and 330 occur in the NTW. For instance, when the DTW does not provide sufficient time to negotiate/schedule the XTWs, the electronic device 102B (e.g., the initiator device) may schedule an NTW with the electronic device 102A and the NTW may be utilized to resume the negotiation/scheduling of the XTWs. In other cases, when the DTW provides sufficient time to negotiate/schedule the XTWs, the XTWs may be negotiated/scheduled during the DTW and data transfers may occur as negotiated/scheduled. In these cases, no separately scheduled NTW is utilized in negotiation/scheduling the XTWs. In some cases, the data transfers may occur within the DTW, right after negotiation/scheduling of the XTWs is complete. The time windows (e.g., DTW, NTW, XTW) may span one or more time slots and may overlap.

In FIG. 3, since the electronic device 102B selects the NTW and transmits the data connection setup request information to the electronic device 102A to schedule data transfer with the electronic device 102A, the electronic device 102B may be referred to as a setup initiator device, or simply an initiator device, and the electronic device 102A may be referred to as a setup responder device, or simply a responder device. In some cases, the electronic device 102B may transmit its advertised availability as a multicast transmission to be received by multiple electronic devices (e.g., including the electronic device 102A). In these cases, the multiple electronic devices may transmit their respective advertised availability to the electronic device 102B. The electronic device 102B may utilize a single NTW setup request frame to set up communication during an NTW for multiple electronic devices (e.g., multiple peers). The electronic device 102B may select different channel(s) and time(s) for each electronic device.

Figure 4:
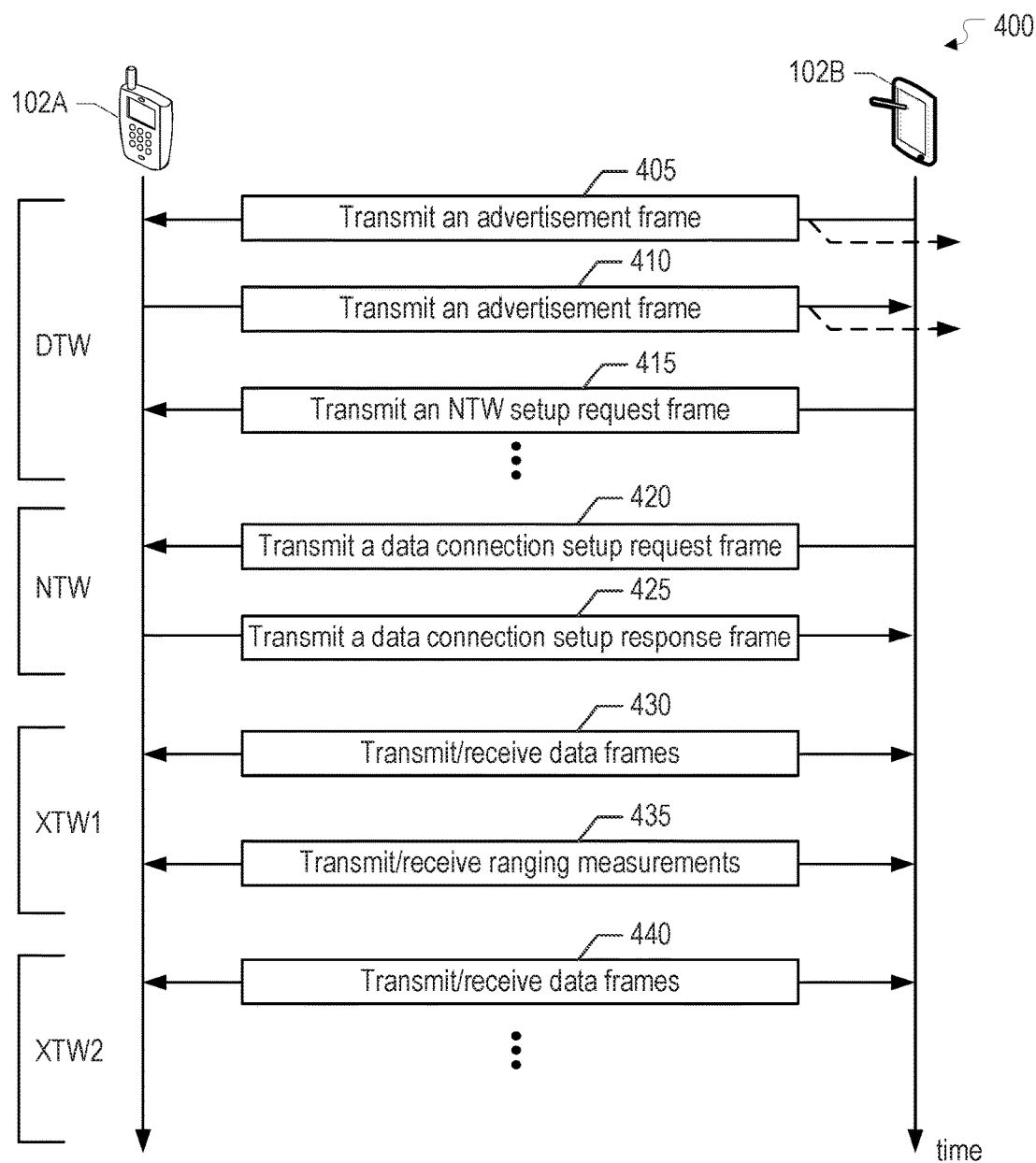
FIG. 4 illustrates a flow diagram of an example process for data communication in a peer-to-peer network in accordance with one or more implementations.

FIG. 4 illustrates a flow diagram of an example process 400 for data communication in a peer-to-peer network in accordance with one or more implementations. For explanatory purposes, the example process 400 is described herein with reference to the electronic devices 102A-B of the example network environment 100 of FIG. 1; however, the example process 400 is not limited to the electronic devices 102A-B of the example network environment 100 of FIG. 1. The blocks of example process 400 are described herein as occurring in serial, or linearly. However, multiple blocks of example process 400 may occur in parallel. In addition, the blocks of example process 400 need not be performed in the order shown and/or one or more of the blocks of example process 400 need not be performed.

The electronic device 102B transmits an advertisement frame to the electronic device 102A (405). The advertisement frame may include advertised availability $PAV_B$ and/or $CAV_B$. The electronic device 102A transmits an advertisement frame to the electronic device 102B (410). The advertisement frame may include advertised availability $PAV_A$ and/or $CAV_A$. The electronic device 102B transmits an NTW setup request frame to the electronic device 102A (415). The NTW setup request frame may be utilized to notify the electronic device 102A of the NTW and request that the electronic device 102A conduct/resume data connection setup in the NTW. The NTW setup request frame may include a MAC address (e.g., unicast MAC address, multicast MAC address), channel (e.g., NTW channel), time slot (e.g., NTW time slot), and/or setup type(s). The electronic device 102A is set to be awake during the NTW to allow communication with the electronic device 102B. The advertisement frames and the NTW setup request frame may occur within a DTW. In some cases, the NTW setup request frame may occur in a time window which is outside of a DTW and is part of $CAV_A$ if there is insufficient amount of time for the electronic device 102B to transmit the NTW setup request frame within the DTW. Although in FIG. 4 the advertisement frame from the electronic device 102B precedes the advertisement frame from the electronic device 102A, the advertisement frame from the electronic device 102B may follow the advertisement frame from the electronic device 102A. The advertisement frame from the electronic device 102A and/or 102B may be multicast to other devices, as shown by the dashed arrows in FIG. 4.

In the NTW, the electronic device 102B transmits a data connection setup request frame to the electronic device 102A (420). The data connection setup request frame may include setup type(s), advertised availability $PAV_B^*$ being proposed for the data connection, among other information. The advertised availability $PAV_B^*$ may be the same or may be different from $PAV_B$. In the NTW, the electronic device 102A transmits a data connection setup response frame to the electronic device 102B (425). The data connection setup response frame may include a status (e.g., an operational status of the electronic device 102A), a DAV, among other information. The DAV may be formed of $XTW_1$, $XTW_2$, etc. and are the set of channel/time windows negotiated for data transfers (e.g., data communication, ranging measurements, other services).

In the $XTW_1$, $XTW_2$, ..., the electronic devices 102A and 102B exchanges data frames (430, 440) and ranging measurements (435) or other frames. Although in FIG. 4 the data transfers (e.g., data frames, ranging measurements) are shown as bidirectional, the data transfers may be unidirectional with one device (e.g., the electronic device 102A) as the receiver and the other device (e.g., the electronic device 102B) as the transmitter.

In some cases, if additional time remains within the NTW subsequent to the data connection setup, data transfer between the electronic devices 102A and 102B may begin in the NTW. In such cases, the $XTW_1$ may be considered to overlap the NTW. After the NTW, data transfer may continue in a subsequent XTW (e.g., the $XTW_2$).

Figure 5:
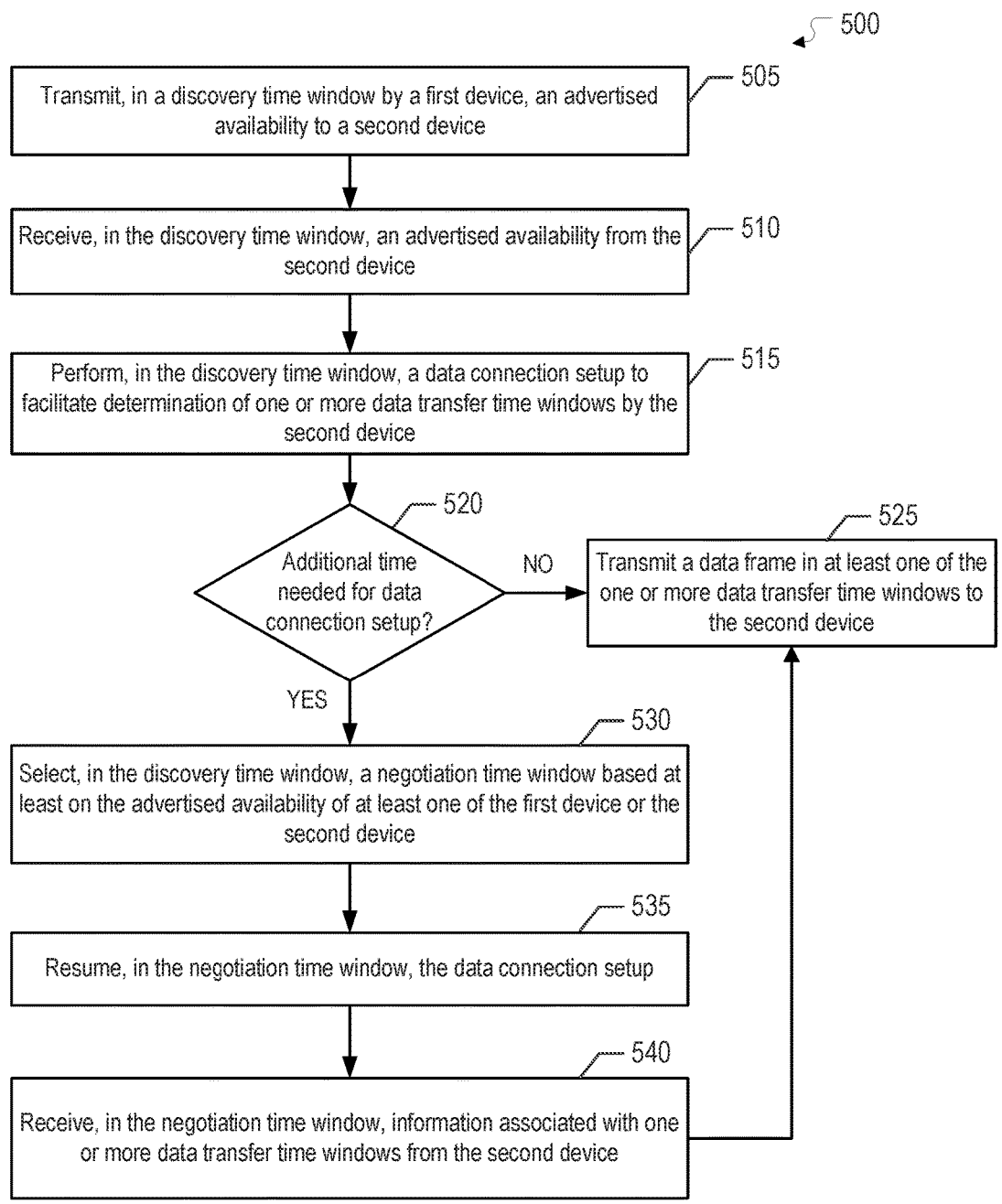
FIG. 5 illustrates a flow diagram of an example process for data communication in a peer-to-peer network in accordance with one or more implementations.

FIG. 5 illustrates a flow diagram of an example process 500 for data communication in a peer-to-peer network in accordance with one or more implementations. For explanatory purposes, the example process 500 is described herein with reference to the electronic devices 102A-B of the example network environment 100 of FIG. 1; however, the example process 500 is not limited to the electronic devices 102A-B of the example network environment 100 of FIG. 1. The blocks of example process 500 are described herein as occurring in serial, or linearly. However, multiple blocks of example process 500 may occur in parallel. In addition, the blocks of example process 500 need not be performed in the order shown and/or one or more of the blocks of example process 500 need not be performed.

The electronic device 102B transmits, in a DTW, an advertisement frame to the electronic device 102A (505). The advertisement frame may include advertised availability $PAV_B$ and/or $CAV_B$. The electronic device 102A transmits, in the DTW, an advertisement frame to the electronic device 102B (510). The advertisement frame may include advertised availability $PAV_A$ and/or $CAV_A$.

The electronic device 102B indicates, in the DTW, a data connection setup to facilitate determination of one or more data transfer time windows (515). In some cases, the electronic device 102B initiates, in a time window which is outside DTW and is part of the $CAV_A$, the data connection setup with the electronic device 102A. The electronic device 102B may initiate the data connection setup by transmitting setup request information to the electronic device 102A. The setup request information may include setup type(s), potential time and channel availability of the electronic device 102B, among other operational parameters. The electronic device 102A may transmit, in the DTW, the data transfer time windows to the electronic device 102B when the data connection setup is complete.

The electronic device 102B determines whether additional time is needed to complete the data connection setup (520). When the data connection setup is completed in the DTW, the electronic device 102B transmits a data frame in the data transfer time windows received from the electronic device 102A (525).

When additional time is needed to complete the data connection setup (e.g., the data connection setup cannot be completed within the DTW), the electronic device 102B selects a NTW based on the intersections of the advertised availability of the electronic device 102A and the electronic device 102B (530). The electronic device 102B may transmit an NTW setup request frame to notify the electronic device 102A of the NTW and request that the electronic device 102A conduct/resume the data connection setup in the NTW. The electronic device 102B resumes, in the NTW, the data connection setup (535) and receives, in the NTW, information associated with one or more data transfer windows from the electronic device 102A (540). In some cases, when a first portion of the data connection is completed in the DTW but a second portion of the data connection setup is not completed in the DTW, the electronic device 102B may resume, in the NTW, the second portion of the data connection setup. For instance, each portion of the data connection setup may involve scheduling some of the data transfer windows (e.g., scheduling a subset of the DAV). The first portion of the data connection setup may be associated with scheduling the NTW and/or scheduling a subset of the DAV. The electronic device 102B transmits a data frame in the data transfer time windows received from the electronic device 102A (525).

In some cases, when selecting the XTW, the electronic device 102A may select a first XTW (e.g., $XTW_1$) after the NTW, a DTW, or other time slots in its current CAV, if possible, to minimize power consumption. When the data transfer time (e.g., requested by the electronic device 102B) extends across multiple time slots, the electronic device 102A may select contiguous time slots for $XTW_1$, $XTW_2$, etc., if possible, to minimize power consumption. For instance, since both ramping down and ramping up overhead times are associated with device power consumption, the electronic device 102A may select the NTW time slot that temporally follows the DTW time slot to save the ramping down time overhead of going to sleep at the end of the DTW and the ramping up time overhead of waking up before the start of the NTW time slot. However, congestion of the medium may occur if every device in the peer-to-peer network selects the same time slot (e.g., the NTW time slot is selected to temporally follow the DTW time slot).

In one or more implementations, the selection of the NTW time slot may be performed through a randomization of communication time slots. By randomizing the NTW time slot index, the probability of overlapping NTWs utilized by the different electronic devices (e.g., the electronic devices 102A-C) may be reduced, thereby reducing medium congestion. The methods may allow power consumption to be lower while providing scalability and reducing contention. Various example methods for facilitating randomization of the NTW time slot index are provided herein. In some cases, the various methods may be performed each time availability (e.g., PAV and/or CAV) is advertised.

For explanatory purposes, the electronic device 102B is the initiator device and the electronic device 102A is the responder device. A time slot index 0 is the index of the time slot of the $DTW_m$ in which the electronic devices 102A and 102B announce their respective CAV and PAV and a time slot index N−1 is the index of the time slot immediately before the time slot of the subsequent $DTW_{m+1}$, where m is an integer. In such cases, the time slot index 1 is the time slot right after a DTW. The electronic device 102B may select a time slot index based on the intersection of $PAV_A$ and $PAV_B$, denoted as $PAV_{AB}$, or the intersection of $PAV_A$ and $PAV_B^*$, denoted as $PAV_{AB}^*$, to be the NTW.

A randomization method to elect NTW may be used to reduce the medium congestion, and/or provide differentiated quality of service performance to traffic of different categories.

In a first method, when the electronic device 102B (e.g., the initiator device) selects the time slot of the NTW from $PAV_{AB}$, the electronic device 102B may select each element of $PAV_{AB}$ with a probability of 1/M, where M=#$PAV_{AB}$ and #$PAV_{AB}$ represents the number of time slots in the set $PAV_{AB}$. In some cases, since each device is likely to have time slot 1 included in its PAV, time slot 1 may have a higher probability than other time slots of being selected as the NTW.

In a second method, let $PAV\_1^{st}\_slot$ denote a smallest time slot index of the PAV advertised by a device and let $PAV\_1^{st}\_slot\_X$ denote the $PAV\_1^{st}\_slot$ advertised by device X. When generating the PAV, which may be denoted as $PAV_B^*$, the electronic device 102B may select $PAV\_1^{st}\_slot$ to be a value between 1 and N' based on a uniform distribution, where N'≤(N−1), and N is the number of slots between two adjacent DTWs. If the generated $PAV\_1^{st}\_slot$ conflicts with other operations performed by the electronic device 102B (e.g., operations unrelated to the peer-to-peer communication with the electronic device 102A), then generation of the $PAV\_1^{st}\_slot$ may be repeated until a $PAV\_1^{st}\_slot$ is obtained that avoids conflicts. In some cases, to avoid an empty set of $PAV_{AB}$, the electronic device 102B (e.g., the initiator device) may adopt the $PAV\_1^{st}\_slot$ of the electronic device 102A (e.g., the responder device) as its $PAV\_1^{st}\_slot$. The electronic device 102B may select a smallest time slot index from $PAV_{AB}$ or $PAV_{AB}^*$ to be the NTW.

To facilitate differentiated quality of service (QoS) performance (e.g., differentiated priorities, differentiated latency performance), different categories of traffic may use a different upper bound for the range of the random value for determining the NTW time slot index. For example, let $c_1$, $c_2$, ..., $c_k$ denote k traffic categories. The $PAV\_1^{st}\_slot$ for traffic category $c_x$ and $c_y$ (where x and y are between 1≤x, y≤k) may be a random number uniformly distributed between 1 and $N_{c\_x}$ and $N_{c\_y}$, respectively. In this example, $N_{c\_x}$ may be smaller than $N_{c\_y}$ if, e.g., traffic category $c_x$ is associated with (e.g., requires) a lower latency than traffic category $c_y$. As an example, $c_x$ may be associated with voice data whereas $c_y$ may be assorted with best effort data, where voice data is generally associated with lower latency than best effort data.

In a third method, the electronic device 102B (e.g., the initiator device) may compute $PAV_{AB}'$, which denotes the intersection of $PAV_{AB}$, $CAV_A$ of the electronic device 102A (e.g., the responder device) if available, and $CAV_B$ of the electronic device 102B. If $PAV_{AB}'$ is not empty, the electronic device 102B may perform the first method with the time slot of the NTW being selected from $PAV_{AB}'$. If $PAV_{AB}'$ is empty, the electronic device 102B may perform the first method with the time slot of the NTW being selected from $PAV_{AB}$, as described previously.

In a fourth method, the electronic device 102B may perform the second method to generate $PAV_{AB}$ and compute $PAV_{AB}'$ based on the generated $PAV_{AB}$. The electronic device 102B may select a smallest time slot index from $PAV_{AB}'$ to be the NTW.

The first through fourth methods for determining NTW and/or determining advertised availability (e.g., advertised PAV) are provided by way of example. Other randomization strategies may be utilized. For example, other distributions aside from the uniform distribution may be employed in the randomization. In some aspects, each device (e.g., the electronic devices 102A-B) can monitor the medium congestion level and eliminate highly congested time slot(s) from its advertised availability (e.g., advertised PAV).

When using a randomization strategy/method to elect/select the NTW, the NTW represents the first time window after the DTW. For example, when the NTW is actually inside a DTW (because there is sufficient time to complete the data connection setup within a DTW), then the first time window after a DTW is $XTW_1$. In this case, the randomization strategy/method (examples of which are described above) applies to $XTW_1$.

In one or more implementations, an indication of whether traffic is buffered for a peer device or a set of peer devices may be utilized to facilitate improvement of power save performance. In some cases, the indication may be provided through use of an efficient (e.g., compact) representation of a set of data. For instance, a bloom filter may be utilized to reduce overhead associated with signaling buffered traffic indication. The existence of traffic may be indicated by including a bloom filter for representing a set of MAC addresses in frames transmitted in the DTW and/or the XTW. An indication may encompass a unicast and/or a multicast buffered traffic indication. For example, the bloom filter may indicate the existence of unicast and/or multicast data by including unicast and/or multicast MAC addresses. A device may sleep until a next indication if one or more of the following conditions are satisfied: the device has no traffic to send; there is no indication of unicast traffic existence from a peer device (e.g., the peer device's MAC address is not a member of the bloom filter); and/or there is no indication of multicast traffic existence from a peer (e.g., a group multicast MAC address for a group in which the device is a member is not a member of the bloom filter).

Although the foregoing describes the use of a bloom filter for signaling buffered traffic indication, other manners by which to signal buffered traffic indication may be utilized. For instance, a bit of information may be associated each device. The bit may be set to a first state (e.g., 0 state) to indicate the device has no buffered traffic and set to a second state (e.g., 1 state) to indicate the device has buffered traffic. Alternatively, a device's MAC address may be used.

Figure 6:
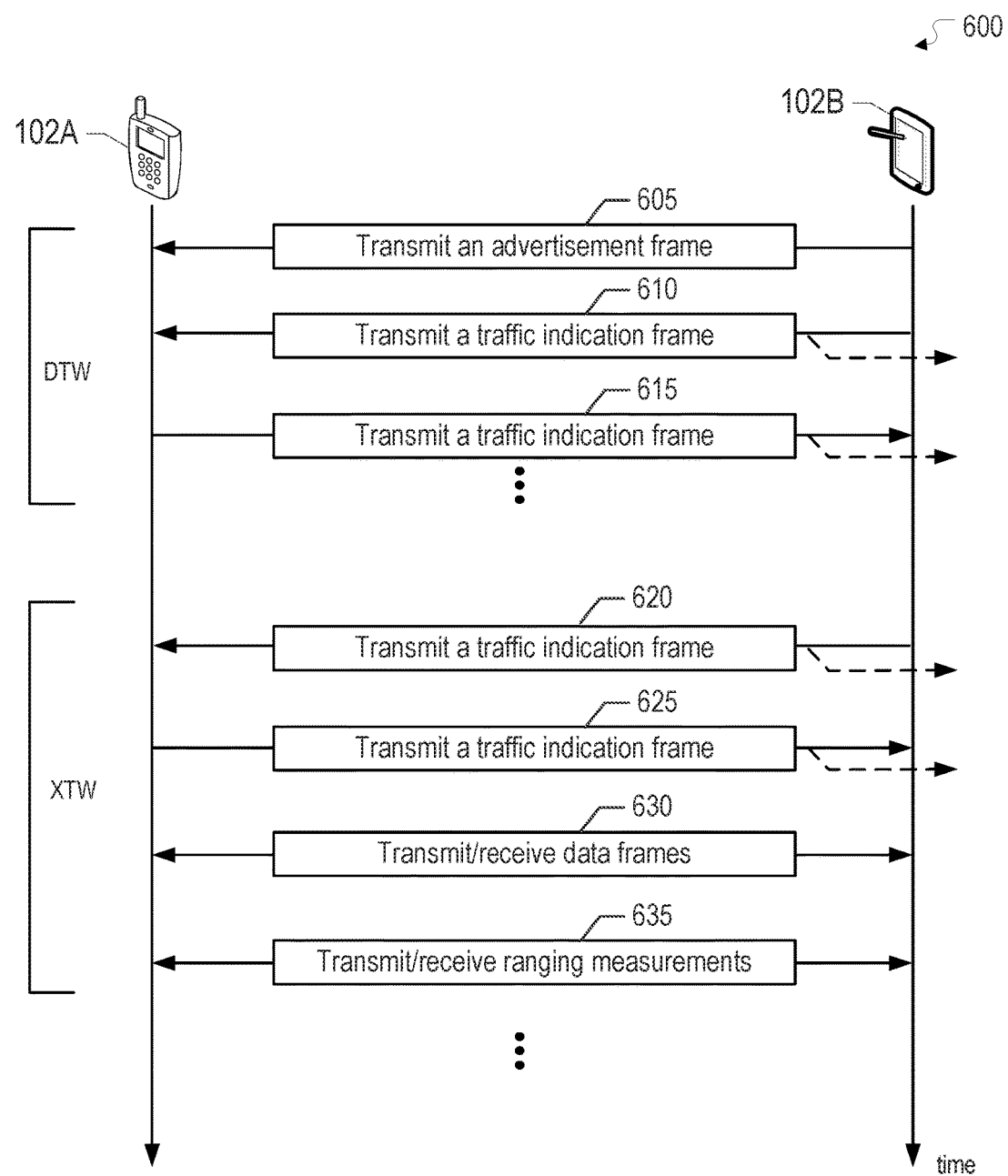
FIG. 6 illustrates a flow diagram of an example process for communication of traffic indications in a peer-to-peer network in accordance with one or more implementations.

FIG. 6 illustrates a flow diagram of an example process 600 for communication of traffic indications in a peer-to-peer network in accordance with one or more implementations. For explanatory purposes, the example process 600 is described herein with reference to the electronic devices 102A-B of the example network environment 100 of FIG. 1; however, the example process 600 is not limited to the electronic devices 102A-B of the example network environment 100 of FIG. 1. The blocks of example process 600 are described herein as occurring in serial, or linearly. However, multiple blocks of example process 600 may occur in parallel. In addition, the blocks of example process 600 need not be performed in the order shown and/or one or more of the blocks of example process 600 need not be performed.

The electronic device 102B transmits, in a DTW, an advertisement frame to the electronic device 102A (605). The advertisement frame may include advertised availability $PAV_B$ and/or $CAV_B$. The electronic device 102B transmits, in the DTW, a traffic indication frame to the electronic device 102A (610). The electronic device 102A transmits, in the DTW, a traffic indication frame to the electronic device 102B (615). The traffic indication frames from the electronic device 102A and/or 102B may be multicast to other devices, as shown by the dashed arrows in FIG. 6. The traffic indication frames may include MAC addresses and whether devices associated with the MAC addresses hold buffered traffic. In some cases, the traffic indication frames may utilize a bloom filter with one or more MAC addresses.

The electronic device 102B transmits, in an XTW, a traffic indication frame (620). The electronic device 102A transmits, in an XTW, a traffic indication frame (625). The electronic devices 102A and 102B exchanges data frames (630) and ranging measurements (635). The XTW may be associated with an agreed upon time and channel in a prior DTW (not shown) or NTW (not shown) by the electronic devices 102A and 102B (e.g., via a data connection setup) for data transfer. The traffic indication frames may be transmitted in the DTW and the XTW(s). The traffic indication frames may include traffic indications that encompass unicast and multicast buffered traffic indications.

In one or more implementations, the electronic device 102A (e.g., the responder device) may construct a DAV by selecting time slots (e.g., XTWs) for data transfer with the electronic device 102B. The number of time slots included in the DAV may be based on throughput requirements associated with the data transfer session between the electronic device 102A and the electronic device 102B. The number of time slots may be denoted as R (where R≥1), with DAV being formed of $XTW_1, XTW_2, \ldots, XTW_R$. In some cases, the number of time slots R utilized (e.g., required) for a data communication session may be determined based on one or more of a desired (e.g., required) throughput for the data communication session, denoted as $T_{Req}$, a total throughput possible within the interval between DTWs, denoted as $T_{inter-DTW}$, or a number of time slots in the intersection of $PAV_A$ and $PAV_B^*$, denoted as $\#PAV_{AB}^*$. For example, R may be set to (a) $(T_{Req}/T_{inter-DTW}) \times (N-1)$ or (b) $\#PAV_{AB}^*$, whichever is smaller, where N−1 is the index of the time slot immediately before the time slot of a subsequent DTW. In some cases, if some or all of the time slots chosen in R are shared between the connection being set up (e.g., between the electronic device 102A and 102B) and other connections, R may be increased until the chosen time slots meet throughput requirements for all the connections. In these cases, R may be set to (c) $(T_{Req}+\text{sum of } T[\text{req-existing-connection}])/T_{inter-DTW}$, where sum of T[req-existing-connection] represents a sum of the throughput requirement associated with all existing connections (e.g., including the connection between the electronic device 102A and 102B).

To construct the DAV that includes R time slots, the electronic device 102A may select time slots associated with the CAVs of the electronic device 102A and/or 102B. Utilizing the CAV may facilitate power saving, since the CAV generally indicates time slots during which a device is awake. The electronic device 102A may fill the R time slots based at least on $CAV_A$. For instance, the electronic device 102A may fill the R time slots with the intersection of $CAV_A$ and $PAV_{AB}*$, denoted as $CAV_{AB}$, excluding any time slots in $CAV_{AB}$ that correspond to a DTW. Once the available time slots from $CAV_{AB}$ are exhausted, the electronic device 102A may select the remaining time slots from $PAV_{AB}*$, excluding any time slots of $PAV_{AB}*$ that correspond to a time slot already in the DAV and/or correspond to a DTW.

In some cases, the electronic device 102A may have a configuration option of whether to utilize CAV (e.g., $CAV_A$ and/or $CAV_B$) in the construction of the DAV. Utilizing the CAV may facilitate power saving, since the CAV generally indicates time slots during which a device is awake. Not utilizing the CAV (e.g., selecting only time slots and/or channels from the PAV) may facilitate increased throughput and reduce interference with other sessions, since utilizing a time slot and/or channel in the CAV involves increasing operations (e.g., transmissions, receptions) performed during the time slot and/or at the channel.

In some cases, the construction of the DAV may cause modification of throughput associated with other data sessions, such as data communication(s) scheduled in one or more of the XTWs in the DAV by other data sessions. For instance, scheduling an additional data transfer in a time slot in the CAV may reduce an expected throughput of other data transfers already scheduled for the time slot. Upon connection/session termination, DAV may be renegotiated for existing sessions (e.g., to adjust for throughput that may be reduced due to the current scheduling).

FIG. 7 conceptually illustrates an electronic system 700 with which one or more implementations of the subject technology may be implemented. The electronic system 700, for example, may be, or may be coupled to, a gateway device, a set-top box, a desktop computer, a laptop computer, a tablet computer, a server, a switch, a router, a base station, a receiver, a phone, a personal digital assistant (PDA), or generally any electronic device that transmits signals over a network. The electronic system 700 can be, and/or can be a part of, one or more of the electronic devices 102A-C. Such an electronic system includes various types of computer readable media and interfaces for various other types of computer readable media. The electronic system 700 includes a bus 708, one or more processor(s) 712, a system memory 704 or buffer, a read-only memory (ROM) 710, a permanent storage device 702, an input device interface 714, an output device interface 706, and one or more network interface(s) 716, or subsets and variations thereof.

The bus 708 collectively represents all system, peripheral, and chipset buses that communicatively connect the numerous internal devices of the electronic system 700. In one or more implementations, the bus 708 communicatively connects the one or more processor(s) 712 with the ROM 710, the system memory 704, and the permanent storage device 702. From these various memory units, the one or more processor(s) 712 retrieve instructions to execute and data to process in order to execute the processes of the subject disclosure. The one or more processor(s) 712 can be a single processor or a multi-core processor in different implementations.

The ROM 710 stores static data and instructions that are needed by the one or more processor(s) 712 and other modules of the electronic system 700. The permanent storage device 702, on the other hand, may be a read-and-write memory device. The permanent storage device 702 may be a non-volatile memory unit that stores instructions and data even when the electronic system 700 is off. In one or more implementations, a mass-storage device (such as a magnetic or optical disk and its corresponding disk drive) may be used as the permanent storage device 702.

In one or more implementations, a removable storage device (such as a floppy disk, flash drive, and its corresponding disk drive) may be used as the permanent storage device 702. Like the permanent storage device 702, the system memory 704 may be a read-and-write memory device. However, unlike the permanent storage device 702, the system memory 704 may be a volatile read-and-write memory, such as random access memory. The system memory 704 may store any of the instructions and data that one or more processor(s) 712 may need at runtime. In one or more implementations, the processes of the subject disclosure are stored in the system memory 704, the permanent storage device 702, and/or the ROM 710. From these various memory units, the one or more processor(s) 712 retrieve instructions to execute and data to process in order to execute the processes of one or more implementations.

The bus 708 also connects to the input and output device interfaces 714 and 706. The input device interface 714 enables a user to communicate information and select commands to the electronic system 700. Input devices that may be used with the input device interface 714 may include, for example, alphanumeric keyboards and pointing devices (also called "cursor control devices"). The output device interface 706 may enable, for example, the display of images generated by the electronic system 700. Output devices that may be used with the output device interface 706 may include, for example, printers and display devices, such as a liquid crystal display (LCD), a light emitting diode (LED) display, an organic light emitting diode (OLED) display, a flexible display, a flat panel display, a solid state display, a projector, or any other device for outputting information. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

As shown in FIG. 7, the bus 708 also couples the electronic system 700 to one or more networks (not shown) through one or more network interface(s) 716. One or more network interface(s) may include an Ethernet interface, a WiFi interface, a cellular interface, a reduced gigabit media independent interface (RGMII), or generally any interface for connecting to a network. The one or more network interfaces 716 may include, or may be coupled to, a physical layer module. In this manner, the electronic system 700 can be a part of one or more networks of computers (such as a local area network (LAN), a wide area network (WAN), or an Intranet, or a network of networks, such as the Internet. Any or all components of the electronic system 700 can be used in conjunction with the subject disclosure.

In the foregoing description, when references to time windows (e.g., DTW, NTW, XTW) or time slots are made, references to channels are implied even if not explicitly stated. For example, a reference to a time slot may also be a reference to a time-frequency slot or slice.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In some implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as application specific integrated circuits (ASICs) or field programmable gate arrays (FPGAs). In one or more implementations, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

As used in this specification and any claims of this application, the terms "base station", "receiver", "computer", "server", "processor", and "memory" all refer to electronic or other technological devices. These terms exclude people or groups of people. For the purposes of the specification, the terms "display" or "displaying" means displaying on an electronic device.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration." Any embodiment described herein as "exemplary" or as an "example" is not necessarily to be construed as preferred or advantageous over other embodiments. Furthermore, to the extent that the term "include," "have," or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A device, comprising:
    at least one processor circuit configured to:
        initiate, in a discovery time window of a plurality of discovery time windows, a data connection setup with a second device;
        in response to the data connection setup not being completed within the discovery time window:
            randomly select, in a next discovery time window, a time window from among a subset of available time slots identified in at least one of an advertised availability of the device or an advertised availability of the second device; and
            resume, in the time window, the data connection setup; and
        receive information associated with one or more data transfer time windows from the second device upon completion of the data connection setup, wherein the one or more data transfer time windows are selected based at least on the data connection setup.

2. The device of claim 1, wherein the advertised availability of the second device comprises an advertised committed availability of the second device indicative of one or more durations during which the second device is scheduled to be awake and an advertised potential availability of the second device indicative of one or more durations during which the second device is available to be scheduled to be awake if a connection setup is requested, and wherein the time window is outside of the discovery time window and is part of the advertised committed availability or advertised potential availability of the second device.

3. The device of claim 1, wherein the advertised availability of the device comprises:
    a committed availability indicative of one or more time slots during which and channels at which the device is scheduled to be awake; and
    a potential availability indicative of one or more time slots during which and channels at which the device is available to be scheduled to be awake.

4. The device of claim 1, wherein the at least one processor circuit is configured to,
    in response to the data connection setup not being completed within the discovery time window:
        notify the second device of the time window; and
        request that the second device resume the data connection setup in the time window; and
    in response to a first portion of the data connection setup being completed in the discovery time window but a second portion of the data connection setup not being completed in the discovery time window, resume, in the time window, the second portion of the data connection setup.

5. The device of claim 4, wherein the first portion of the data connection setup is associated with scheduling of at least one of the time window in which the remaining data connection setup occurs or a first subset of the one or more data transfer time windows, and wherein the second portion of the data connection setup is associated with scheduling of a second subset of the one or more data transfer time windows.

6. The device of claim 1, wherein the at least one processor circuit is configured to receive the information associated with the one or more data transfer time windows in the discovery time window in response to the data connection setup being completed within the discovery time window.

7. The device of claim 1, wherein the at least one processor circuit is configured to, in response to the data connection setup not being completed within the discovery time window, select the time window by selecting an available time slot outside of the discovery time window from among intersections of available time slots of both the advertised availability of the device and the advertised availability of the second device.

8. The device of claim 7, wherein the at least one processor circuit is configured to select any available time slot from among the intersections of the available time slots with equal probability.

9. The device of claim 1, wherein:
    the advertised availability of the device comprises an advertised potential availability of the device and an advertised committed availability of the device,
    the advertised availability of the second device comprises an advertised potential availability of the second device and an advertised committed availability of the second device, and
    the at least one processor circuit is configured to, in response to the data connection setup not being completed within the discovery time window, select the time window by selecting from among a first intersection of the advertised potential availability of the device, the advertised potential availability of the second device, the advertised committed availability of the device, and the advertised committed availability of the second device, wherein each element of the first intersection is associated with a time slot.

10. The device of claim 9, wherein the at least one processor circuit is configured to:
    when the first intersection is a non-empty set, select the time window by selecting any time slot among the first intersection with equal probability; and
    when the first intersection is an empty set, select the time window by selecting any time slot among a second intersection of the advertised potential availability of the device and the advertised potential availability of the second device with equal probability.

11. The device of claim 1, wherein:
the advertised availability of the device comprises an advertised potential availability of the device,
a number of time slots between the discovery time window and a next discovery time window is N,
each time slot between the discovery time window and the next discovery time window is associated with a respective time slot index between 1 and N−1, inclusive, and
the at least one processor circuit is configured to select a smallest time slot index of the advertised potential availability of the device from between 1 and N−1, inclusive.

12. The device of claim 11, wherein the at least one processor circuit is configured to select any time slot index from between 1 and N−1 with equal probability.

13. The device of claim 11, wherein the at least one processor circuit is configured to:
generate the advertised potential availability of the device based at least on the selected smallest time slot index;
determine an intersection of the advertised potential availability of the device, an advertised potential availability of the second device, a committed availability of the device, and a committed availability of the second device; and
select as the time window a time slot associated with a smallest time slot index of the intersection.

14. The device of claim 1, wherein:
a number of time slots between the discovery time window and a next discovery time window is N,
each time slot between the discovery time window and the next discovery time window is associated with a respective time slot index, and
the at least one processor circuit is configured to:
determine an upper bound based at least on a traffic category associated with the data connection setup, wherein traffic categories associated with lower setup latency have a lower upper bound; and
select a uniformly distributed random time slot index from between 1 and the upper bound, inclusive, as a smallest time slot index of the advertised availability of the device.

15. The device of claim 14, wherein the at least one processor circuit is configured to:
generate the advertised availability of the device based at least on the selected smallest time slot index, wherein the advertised availability of the device comprises an advertised committed availability of the device and an advertised potential availability of the device;
determine an intersection of the advertised potential availability of the device, an advertised potential availability of the second device, the advertised committed availability of the device, and an advertised committed availability of the second device; and
select as the time window a time slot associated with a smallest time slot index of the intersection.

16. The device of claim 1, wherein the at least one processor circuit is configured to, when the data connection setup is not completed within the discovery time window:
identify a subset of available time slots from among an intersection of available time slots in the advertised availability of the device and the advertised availability of the second device based at least on a traffic category associated with the data connection setup; and
randomly select an available time slot from among the subset of available time slots to be the time window using a randomization strategy.

17. The device of claim 1, wherein the at least one processor circuit is configured to, when the data connection setup is not completed within the discovery time window:
identify a subset of available time slots from among available time slots in the advertised availability of the device based at least on the advertised availability of the second device; and
randomly select an available time slot from among the subset of available time slots to be the time window.

18. The device of claim 1, wherein the at least one processor circuit is configured to:
receive an indication associated with an existence of traffic in a second time window; and
set a power state of the device based at least on the indication.

19. The device of claim 1, wherein the at least one processor circuit is configured to:
transmit a traffic indication frame to the second device, wherein the traffic indication frame comprises an indication of buffered traffic, and wherein the indication of the buffered traffic is based on a bloom filter representation; and
facilitate causing adjustment of a power state of the second device based at least on the traffic indication frame.

20. The device of claim 1, wherein at least one of the one or more data transfer time windows is a time slot in an intersection of a committed availability of the device, a potential availability of the device, and a potential availability of the second device.

21. The device of claim 1, wherein at least one of the one or more data transfer time windows is a time slot in an intersection of a potential availability of the device and a potential availability of the second device.

22. The device of claim 1, wherein a number of data transfer windows in the one or more data transfer windows is based at least on a throughput requirement associated with a data transfer session between the device and the second device.

23. A method, comprising:
receiving, by a first device, an advertised availability of a second device;
randomly selecting a time window from among a subset of available time slots identified in the advertised availability of the second device;
in the randomly selected time window, transmitting, by the first device, setup request information to the second device;
receiving one or more data transfer time windows from the second device, wherein the one or more data transfer time windows are selected based at least on the setup request information; and
transmitting at least one data frame to the second device in the one or more data transfer time windows.

24. The method of claim 23, wherein:
the selected time window is further based on a committed availability of the first device or a potential availability of the first device,
the committed availability of the first device comprises a first plurality of time durations during which the first device is scheduled to be awake, and
the potential availability of the first device comprises a second plurality of time durations during which the first device is available to be scheduled to be awake.

25. The method of claim 24, wherein at least one of the one or more data transfer time windows is scheduled in one of the second plurality of time durations, and wherein the method further comprises adding the one of the second plurality of time durations to the committed availability of the first device.

26. The method of claim 23, wherein the setup request information comprises one or more setup types, potential time availability, and potential channel availability.

27. The method of claim 23, wherein the selected time window is further based on an advertised availability of the first device, and wherein the setup request information comprises the advertised availability of the first device different from the advertised availability of the second device.

28. The method of claim 23, wherein the selected time window overlaps with one of the one or more data transfer time windows.

29. A computer program product comprising instructions stored in a non-transitory tangible computer-readable storage medium, the instructions comprising:
   instructions to receive, by a first device from a second device, a negotiation time window setup request comprising an indication of a negotiation time window;
   instructions to receive, from the second device, setup request information in the negotiation time window;
   instructions to determine one or more data transfer time windows based at least on the setup request information by randomly selecting the one or more data transfer time windows from among time slots indicated in the setup request information; and
   instructions to transmit the one or more data transfer time windows to the second device.

30. The computer program product of claim 29, wherein the setup request information comprises an advertised availability of the second device, and wherein the one or more data transfer time windows are determined based at least on the advertised availability of the second device and an advertised availability of the first device.

31. The computer program product of claim 29, wherein the setup request information comprises an advertised potential availability of the second device, and wherein the one or more data transfer time windows are determined based at least on the advertised potential availability of the second device, an advertised potential availability of the first device, and an advertised committed availability of the first device.

32. The computer program product of claim 29, wherein the instructions to determine the one or more data transfer time windows comprise:
   instructions to determine a first intersection of a committed availability of the first device, a potential availability of the first device, and a potential availability of the second device; and
   instructions to select one or more time slots in the first intersection, wherein each of the one or more time slots in the first intersection is associated with one of the one or more data transfer time windows.

33. The computer program product of claim 32, wherein the instructions to determine the one or more data transfer time windows further comprise:
   instructions to determine a second intersection of the potential availability of the first device and the potential availability of the second device; and
   instructions to select one or more time slots in the second intersection to fill in a remainder of the one or more data transfer time windows, wherein each of the one or more time slots in the second intersection is associated with one of the one or more data transfer time windows, and wherein a number of data transfer windows in the one or more data transfer windows is based at least on a throughput requirement associated with a data transfer session between the first device and the second device.

34. The computer program product of claim 29, wherein the instructions to determine the one or more data transfer time windows further comprise:
   instructions to determine an intersection of a potential availability of the first device and a potential availability of the second device; and
   instructions to select one or more time slots in the intersection, wherein each of the one or more time slots is associated with one of the one or more data transfer time windows.

35. The computer program product of claim 29, wherein the instructions further comprise:
   instructions to determine an intersection of a potential availability of the first device and a potential availability of the second device; and
   instructions to select one or more time slots in the intersection, wherein each of the one or more time slots is associated with one of the one or more data transfer time windows.

* * * * *